Oct. 12, 1965  E. MARTINEZ ETAL  3,211,393
MOTION PICTURE REEL
Original Filed Dec. 18, 1961  2 Sheets-Sheet 1
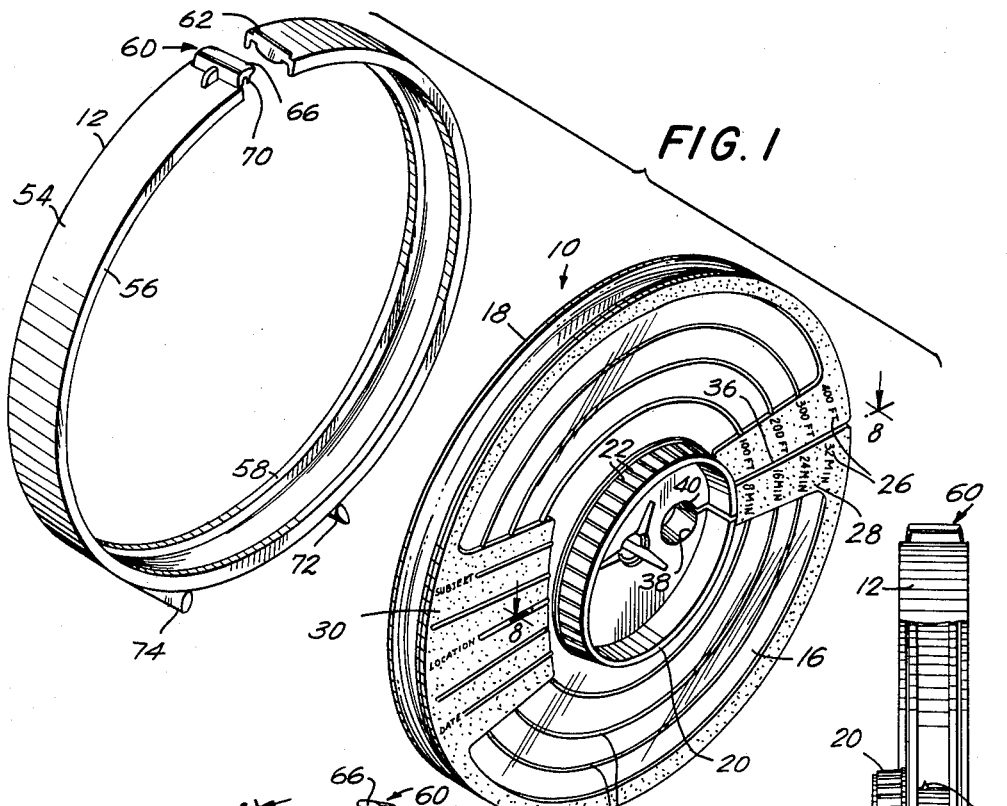
FIG. 1
FIG. 3
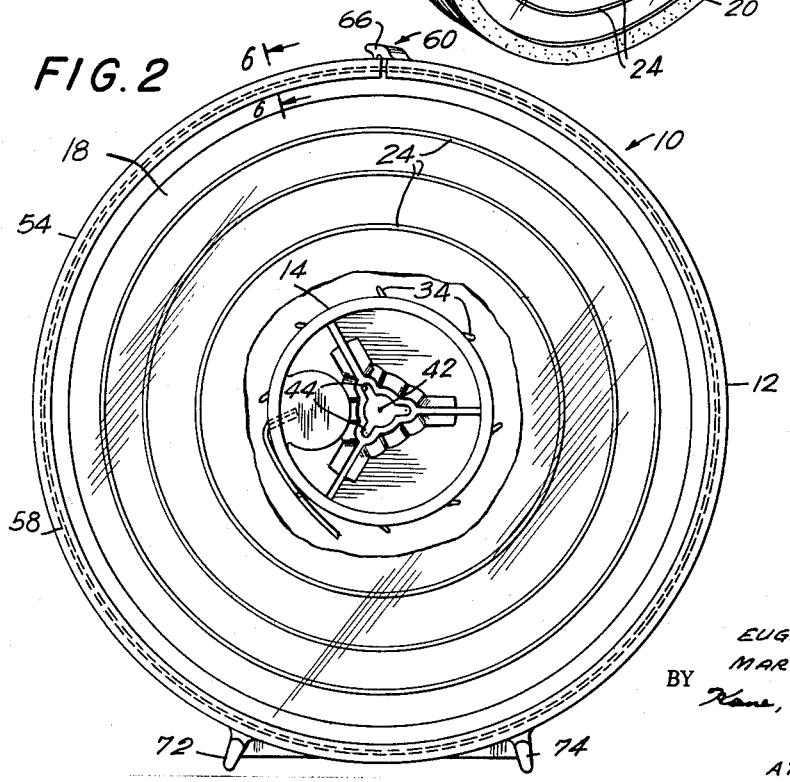
FIG. 2
INVENTORS.
EUGENE MARTINEZ
MARVIN KAPILOW
BY Kane, Dalimier and Kane
ATTORNEYS Oct. 12, 1965  E. MARTINEZ ETAL  3,211,393
MOTION PICTURE REEL
Original Filed Dec. 18, 1961  2 Sheets-Sheet 2

INVENTORS.
EUGENE MARTINEZ
MARVIN KAPILOW
BY
ATTORNEYS

United States Patent Office 3,211,393
Patented Oct. 12, 1965

3,211,393
MOTION PICTURE REEL
Eugene Martinez, Irvington, and Marvin Kapilow, Croton-on-Hudson, N.Y., assignors, by direct and mesne assignments, to Reelco Inc., Irvington, N.Y., a corporation of New York
Original application Dec. 18, 1961, Ser. No. 159,910. Divided and this application Aug. 14, 1963, Ser. No. 306,976
3 Claims. (Cl. 242—74)

This invention relates to an improved motion picture reel, and more particularly, to a structurally and functionally improved reel having a protective ring.

This application is a division of my application Serial No. 159,910 filed December 18, 1961.

Among the numerous objects of the present invention are the provisions of an improved motion picture reel having: an improved funnel feed for guiding the film in and out of the reel; an effective means for hand-winding the reel; an automatic load means for securing the leading end of the web of film; a drop-in loading means for anchoring the film leading end; a built-in control knob for facilitating ease of handling the reel and, at the same time, serving as a guide for proper film and reel loading; suitable indicia means for indicating the number of feet on the reel and amount of show time remaining; an identification panel permitting the reception of writing to describe the contents of the film; and a reel capable of cooperating with a ring stand for the reel to seal the film and protect it from dirt and dust particles yet allowing the film to breathe while permitting the reel to be stored vertically on any convenient shelf and locking the reel sides to prevent accidental unwinding of the film.

Other objects and advantages will become apparent from the following detailed description of the invention which is to be taken in conjunction with the accompanying drawings in which:

FIG. 1 is an exploded perspective view of the motion picture reel and protective ring stand;

FIG. 2 is a rear elevational view of the ring stand stand assembled around the motion picture reel;

FIG. 3 is an end elevational view of the assembled ring stand and reel with certain parts broken away and removed;

Figure 4:
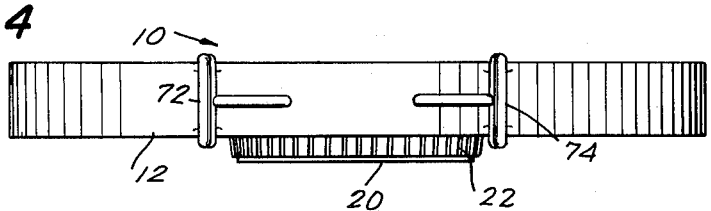
FIG. 4 is a bottom plan view thereof.
Figure 5:
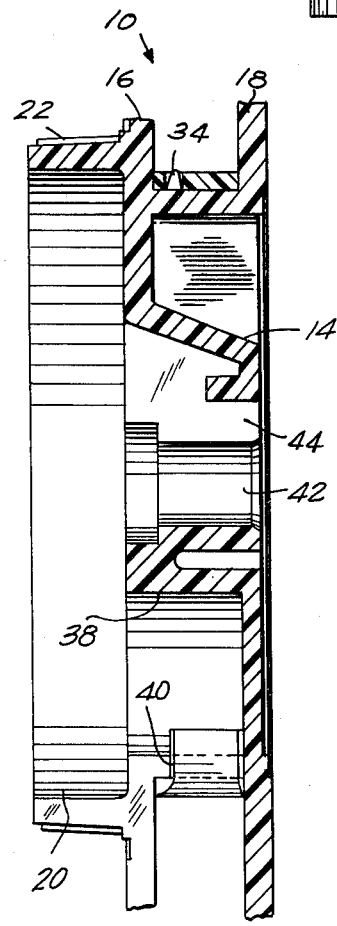
FIG. 5 is an enlarged fragmentary view of the latch of the ring stand.
Figure 5:
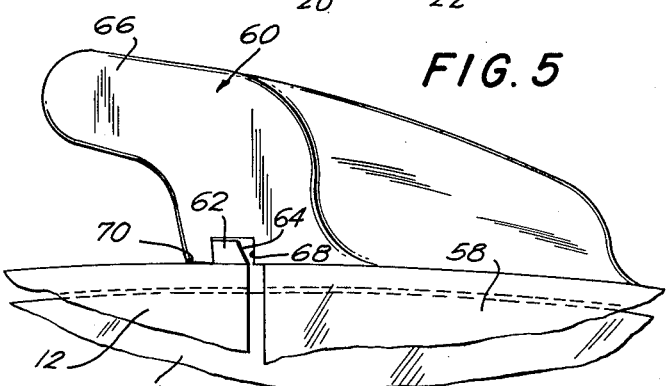
Figure 6:
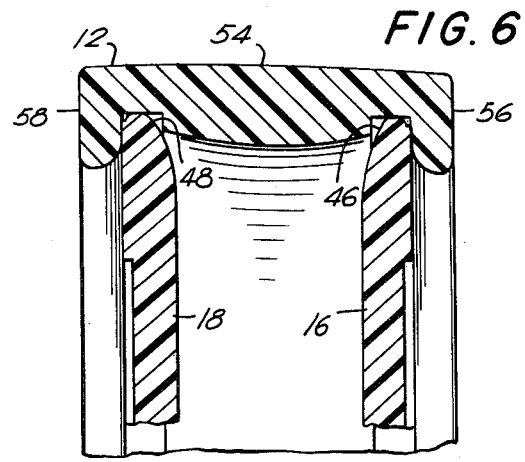
FIG. 6 is an enlarged fragmentary sectional view taken along the line 6—6 of FIG. 2.
Figure 8:
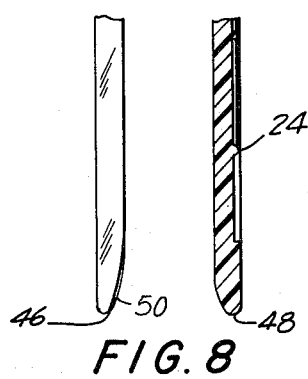
FIG. 8 is an enlarged sectional view, with certain parts broken away and removed, of the reel taken along the line 8—8 of FIG. 1.
Figure 7:
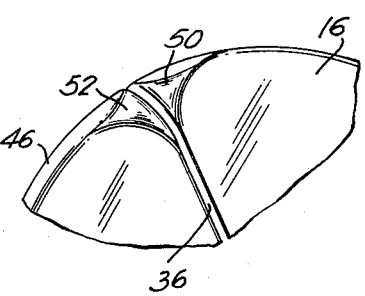
FIG. 7 is an enlarged fragmentary view showing the loading slot at the periphery of the reel.

In the drawings, numeral 10 designates a motion picture reel fabricated in accordance with the present invention, whereas its protective ring stand is identified by number 12. Referring now to the reel 10, it should be understood at the outset that it is preferably molded from a resinous material as a one-piece unit. Thus, the reel is formed with a cylindrical core 14, and spaced, circularly shaped front and rear panels 16 and 18, respectively. A control knob 20 extends from the front panel 16 and serves to facilitate ease in handling of the reel, as well as the film, on a motion picture projector. Film slack is readily taken up by merely twisting the knob in the appropriate direction. Most important, the control knob eliminates the possibility of placing the film reel 10 upside down or backwards on a projector by functioning as an orientation means assuring proper reel mounting. The radial projections 22 enhance one's grip of the knob 20 in carrying out these functions. Film loading is likewise facilitated and by merely using a pencil or rod as a support, the reel can be manually loaded.

The front, as well as rear panels 16 and 18, respectively, are provided with concentric ridges 24 corresponding to a particular number of feet of film wound around the core 14 of the reel 10. Similarly, the ridges will denote the amount of show time of film on the reel. To this end, indicia 26, appearing on a panel portion 28 of the front panel 16, may constitute scales for readily and visually ascertaining the magnitude of these quantities.

The front panel 16 may additionally be fabricated with an integral identification panel portion 30 containing desired descriptive matter. At the same time, writing with a ball point pen or pencil is permitted for purposes of describing the contents of the contained film. The panel portion 30 may be frosted to render the writing more discernable and intelligible.

Dual loading provisions are incorporated into the reel 10 and are individually usable at the selection of an operator. In this connection, both forward and rewind loading is facilitated by pick-up pins 34 having opposed inclination, as illustrated, for inducing winding or rewinding as the case may be.

Drop-in loading is additionally provided in completing the dual loading possible with the disclosed reel. To this end, a radially extending slot 36 is formed in the front panel 16, as well as the control knob 20 and core 14. An opening 38 forms an integral part of the core 14 and permits access for the terminal end of the film to be wound upon the reel 10. This end of the film is adapted to be retained by a built-in film lock created by the curvature 40 of the slot 36 in the core 14. It will be found that only upon deliberate and intentional movement of the end of the film will free it from the slot 36.

The central sector of the reel 10 includes a bore 42 extending therethrough, as well as radial keyways 44. These particular openings facilitate location of the key on the reel mount of a projector. The knob 20, under the circumstances, will aid in keying the reel. The bore 40 may conveniently receive the previously mentioned rod, helpful in manually loading film on the reel.

The inner periphery of the front panel 16, together with the rear panel 18, are arcuately shaped to provide funneling lead-in lips 46 and 48, respectively. The film will accordingly be fed in or out of the reel smoothly. The outer peripheral end of the slot 36 along the inner face of the front panel 16 is embraced by rounded sectors 50 and 52 of somewhat larger radius of curvature thereby providing a smoother transition therebetween. Damage of the film being wound or rewound is accordingly minimized.

As stated, the ring stand 12 seals the film within the reel 10 and protects it from dirt and dust particles. This ring stand 12 includes a split cylindrical body 54. Radially inwardly extending flanges 56 and 58 project from the body 54 and serve to lock the panels 16 and 18 of the reel 10 to not only prevent accidental unwinding of the film, but distortion of the reel itself. The ring stand 12, at the split end of the body 54, is provided with a latch 60 having a lip 62 at one end with a beveled face 64 to expedite the latching operation. An enlarged head 66 is further included and is formed with a transverse slot 68 which is adapted to receive the lip 62. The corner 70 of the head 66 is somewhat curved to facilitate the camming of the head 56 along the beveled face 64 of the lip 62.

The ring stand 12 is also formed with built-in feet 72 and 74 rendering it possible to conveniently store the reels vertically on any shelf.

The reel 10 and ring stand 12 may both be molded from a suitable resinous material which can be light transparent. A special, or for that matter, suitable coloring additive may be incorporated along with the resinous material to provide for a built-in filter for reducing the possibility of film fade.

Thus, the numerous aforenoted objects and advantages are most effectively attained. With this in mind, the present invention is in no sense limited by the specific embodiment disclosed herein, but is to be commensurate with the scope of the appended claims.

We claim:

1. A reel of one-piece molded resin construction comprising: a central cylindrical core adapted for holding the width of a replayable tape, and spaced, within flexible front and rear panels connected together by and extending from said core, said panels being spaced apart a distance substantially equal to the width of motion picture film and the radial length of each panel being greater than the space between the panels, a slot extending from said core through said front panel for receiving an end of the tape to be mounted on the reel, locking means on said core for locking said end of the tape in the slot, the inner face of the outer periphery of both the front and rear panels being tapered outwardly to provide a funnel for the feed of said tape into and from said reel, and a finger grasping central annular knob projecting outwardly from said front panel for facilitating the handling of said reel during replay of the tape and for assuring the correct orientation and mounting of the reel during replay of the tape.

2. The invention in accordance with claim 1 wherein pick-up pins extend outwardly from said core for engaging with sprocket receiving openings of motion picture film.

3. The invention in accordance with claim 1 wherein the walls of said slot and the curved inner face of the outer periphery of the front panel are interconnected by an arcuate surface.

References Cited by the Examiner

UNITED STATES PATENTS

| | | | |
|---|---|---|---|
| 1,386,617 | 8/21 | Gunderman | 242—74 |
| 2,468,767 | 5/49 | Lloyd | 242—74 X |
| 2,477,010 | 7/49 | Schmidt | 242—74 X |
| 2,851,801 | 9/58 | Jennings. | |
| 2,881,894 | 4/59 | Regentrop et al. | 242—71.8 X |

MERVIN STEIN, *Primary Examiner.*

RUSSELL C. MADER, *Examiner.*